Figure 1:
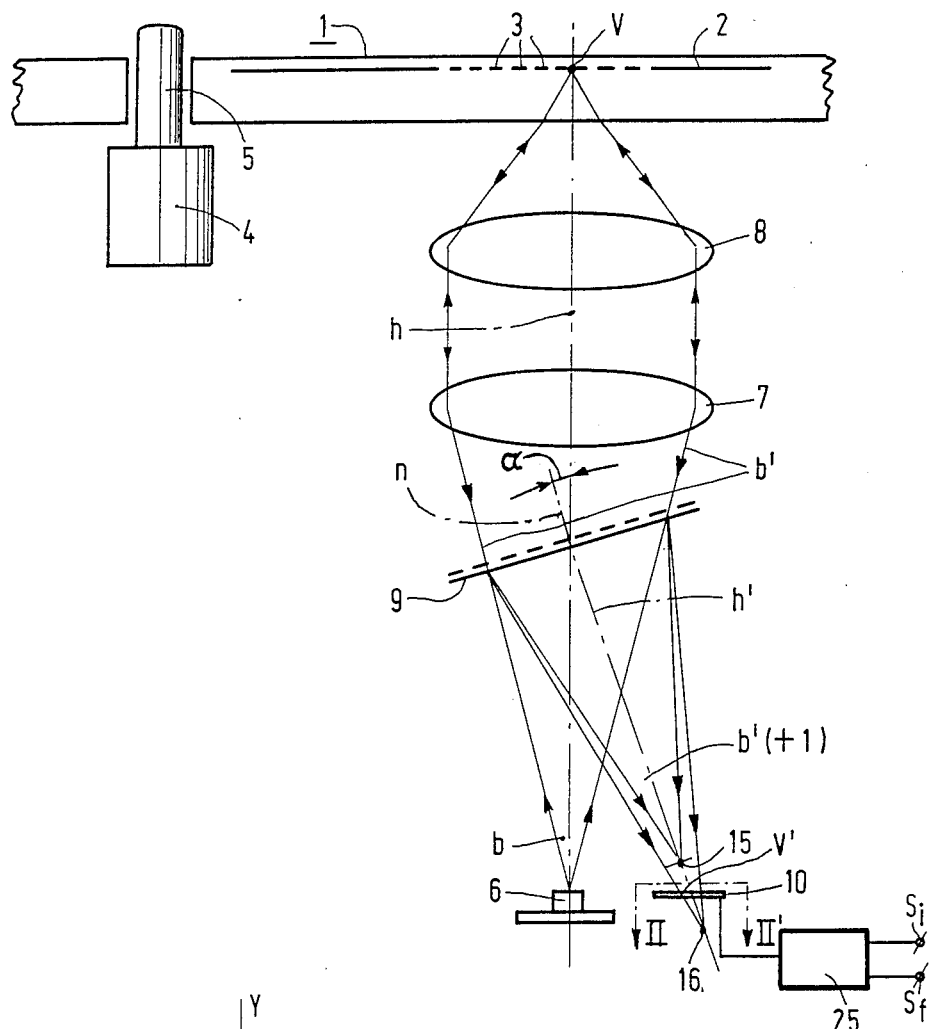

United States Patent [19]

Greve

[11] Patent Number: 4,771,411
[45] Date of Patent: Sep. 13, 1988

[54] DEVICE FOR SCANNING A RADIATION-REFLECTING INFORMATION SURFACE WITH OPTICAL RADIATION

[75] Inventor: Peter F. Greve, Eindhoven, Netherlands

[73] Assignee: U. S. Philips Corporation, New York, N.Y.

[21] Appl. No.: 939,192

[22] Filed: Dec. 8, 1986

[30] Foreign Application Priority Data

Aug. 1, 1986 [NL] Netherlands .......................... 8601974

[51] Int. Cl.$^4$ .......................... G11B 12/10; O11B 7/00
[52] U.S. Cl. ........................................ 369/45; 369/46; 369/112; 369/109; 350/162.17; 350/162.2; 250/201 DF
[58] Field of Search .................................. 369/44–46, 369/109, 112, 120; 350/162.2, 162.17; 250/201 DF

[56] References Cited

U.S. PATENT DOCUMENTS 4,289,371  9/1981  Kramer .................... 350/162.2 X
4,358,200 11/1982  Heemskerk .................... 356/123

Primary Examiner—Aristotelis M. Psitos
Attorney, Agent, or Firm—Thomas A. Briody; Algy Tamoshunas

[57] ABSTRACT

An optical scanning device is described which comprises a radiation source (6), an objective system (8) and a diffraction grating (9) which is arranged between the objective system and the radiation source to separate the radiation beam (b') reflected by the information surface (2) to be scanned from the beam (b) emitted by the radiation source and for introducing astigmatism in the reflected beam (b') for the purpose of focus-error detection. In principle, the grating (9) has a constant grating period and is arranged at a small angle ($\alpha$) in the beam (b').

4 Claims, 2 Drawing Sheets

DEVICE FOR SCANNING A RADIATION-REFLECTING INFORMATION SURFACE WITH OPTICAL RADIATION

The invention relates to a device for scanning a radiation-reflecting information surface with optical radiation, which device comprises a radiation source, an objective system for focussing a radiation beam produced by the radiation source so as to form a radiation spot on the information surface, a diffraction grating arranged between the radiation source and the objective system for separating the radiation beam reflected by the information surface from the beam emitted by the source and for introducing astigmatism in the reflected beam, and a radiation-sensitive detection system comprising a four-quadrant photodiode for supplying a focus-error signal.

Such a device, which is intended for reading an optical record carrier, provided with a trackwise arranged radiation-reflecting information structure situated in the information surface, is known from U.S. Pat. No. 4,358,200. In this device deviations between the plane of focussing of the objective system and the information surface, referred to as focus errors, must be detected in order to enable the focussing of the objective system to be corrected in such a way that the radiation source is always imaged in focus on the information surface. For this purpose the radiation beam reflected by the information surface is made astigmatic. A radiation-sensitive detection system comprising four detectors is arranged between the astigmatic focal lines of this beam. When the position of the information surface relative to the objective system varies the shape of the radiation spot formed on the detection system also varies. The shape variation can be detection by combining the output signals of the detectors in an appropriate manner. This method of detecting focus errors is known as astigmatic focus-error detection.

Further, in said scanning device the radiation reflected by the information surface must be separated from the radiation emitted by the source, to enable the radiation-sensitive detection system to be arranged in the path of the reflected radiation.

The device described in U.S. Pat. No. 4,358,200 is not only suitable for use in an apparatus for reading radiation-reflecting record carriers but in general for use in optical systems in which deviations between the desired and the actual position of a radiation-reflecting information surface relative to a lens system must be detected, such as microscopes.

In the known device a radiation-transmitting diffraction grating is arranged between the objective system and the radiation source, which grating separates a part of the beam reflected by the information surface from the beam emitted by the radiation source and directs this towards the detection system and, in addition, makes this part of the beam astigmatic. This grating has a linearly varying grating period, i.e. the distance between the centres of two succeeding grating grooves increases from one grating end towards the other. Such a grating is difficult to make and is expensive.

It is the object of the present invention to provide an optical scanning device which utilizes a simpler and cheaper beam-separating and astigmatising grating. This device is characterized in that the grating has a substantially constant grating period and in that the chief ray of the reflected beam makes an acute angle with a normal to the grating.

The invention is based on the recognition of the fact that in the case of non-perpendicular incidence of a radiation beam on a grating of constant grating periods this grating introduces astigmatism in the subbeams which are diffracted in the first and higher orders, which astigmatism depends on the angle of incidence. This astigmatism is sufficiently large to enable the astigmatic focus-error detection method to be applied.

A preferred embodiment of the invention is characterized further in that the distance between the astigmatic focal lines of the beam which is directed towards the detection system by the diffracting grating is of the order of 5 to 15 times the depth of focus of the objective system. The advantage of this is that the resulting focus-error has a statisfactory slope.

When the scanning device is used in an apparatus for reading an optical record carrier, this device may be characterized further in that the magnitude of the angle between the normal to the grating and the chief ray of the reflected beam lies within the range from approximately 10° to approximately 20°. This enables the desired astigmatism of 5 to 15 times the depth of focus to be obtained in current read apparatuses.

The diffraction grating may be a radiation-transmitting grating. However, suitably the scanning device is characterized further in that the grating is radiation-reflecting. The distance between the radiation source and the information plane, measured in a direction transverse to the information plane, can then be minimised, thus enabling the height of the entire scanning device to be minimised, which is in particular of importance in the case of apparatuses for reading optical record carriers. As both the beam emitted by the radiation source and the beam reflected from the information surface are reflected by the same grating the scanning device will exhibit a satisfactory stability.

Figure 2:
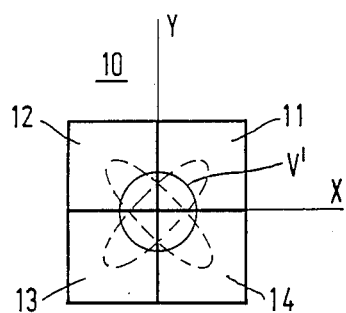
Figure 3A:
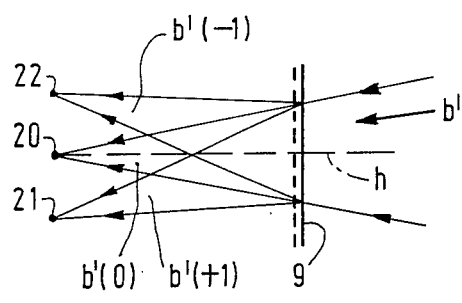
Figure 3B:
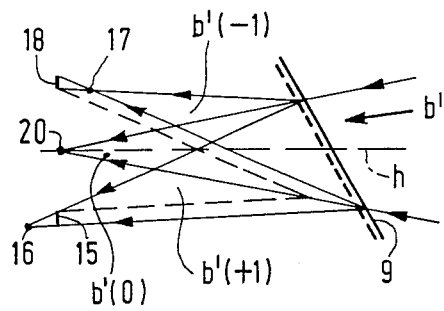
Figure 4:
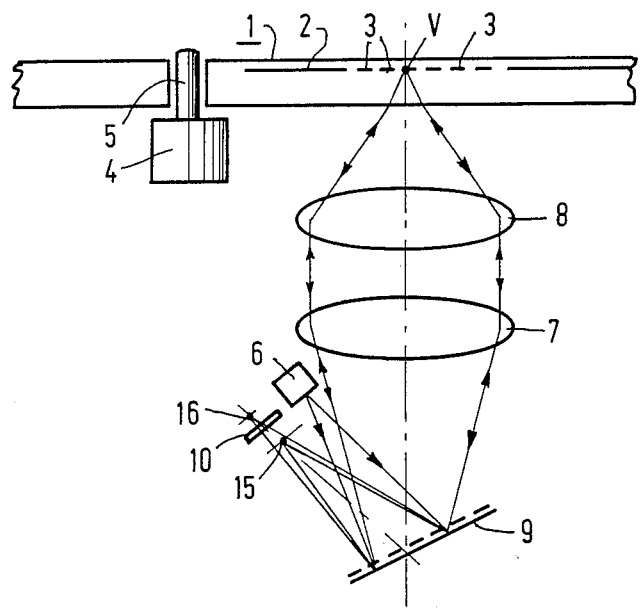

An embodiment of the invention, intended for use in an apparatus for reading an optical record carrier, will now be described in more detail, by way of example, with reference to the accompanying drawings. In the drawings:

FIG. 1 shows a scanning device embodying the invention, comprising a radiation-transmitting grating, FIG. 2 is a plan view of the radiation-sensitive detection system employed in this device, FIGS. 3a and 3b show the paths of the zero order and the first order subbeams formed by a grating arranged transversely of the beam and a grating arranged obliquely relative to the beam respectively, and FIG. 4 shows a scanning device embodying the invention, comprising a radiation-reflecting grating.

In these Figures identical elements bear the same reference numerals.

FIG. 1 is a radial sectional view of a round disc-shaped record carrier 1. The information structure is represented by the information tracks 3 situated in a reflecting information surface 2. The record carrier is illuminated with a read beam b emitted by a radiation source 6, for example a semiconductor-diode laser such as an AlGaAs laser. An objective system 8, which for simplicity is represented as a single lens, focusses the read beam to form a read spot V on the information surface 2. A collimator lens 7 may be arranged between the objective system and the diode laser to converge the diverging beam into a parallel beam of such a cross-section that the pupil of the objective system is filled adequately in order to form a read spot of minimal dimensions in the plane 2. The read beam is reflected from the information surface and, as the record carrier is rotated by means of the shaft 5 driven by the motor 4, it is modulated in conformity with the information contained in a track to be read.

The modulated beam b' must be separated from the beam b emitted by the source 6 to enable a detection system to be arranged in the path of the beam', which system enables the modulation of said beam to be converted into an electric signal. In FIG. 1 the detection system bears the reference numeral 10. This system is connected to an electronic circuit 25 in which, in known manner, a high-frequency information signal $S_i$, a low-frequency focus-error signal $S_f$ and, if applicable, a low-frequency tracking signal $S_r$ are generated. In order to obtain a focus-error signal the beam must be rendered astigmatic.

In accordance with the invention the beam-splitting and astigmatising functions are performed by a diffraction grating 9 having a constant grating period, which grating is arranged obliquely in the beam, i.e. the angle of incidence $\alpha$ between the chief ray h of the beam b' and the normal n to the grating is an acute angle.

The grating 9 splits the incident beam b' into a non-diffracted zero-order subbeam and a plurality of diffracted subbeams of higher orders. The grating parameters, in particular the grating period, i.e. the distance between the centres of two succeeding grating grooves, and the depth and shape of these grooves are selected in such a way that a relatively large portion of the radiation is contained in one of the first-order beams, for example, the +1-order beam b'(+1).

Since the grating is arranged obliquely in the beam b' a subbeam traversing the grating is not focussed in one point but two mutually perpendicular focal lines, are formed which are referred to as astigmatic focal lines, which are shifted relative to one another along the axis of the relevant subbeam. This is schematically illustrated in FIGS. 3a and 3b. FIG. 3a represents the situation in which the chief ray h of the beam b' is perpendicularly incident on the grating. The grating then splits the beam b' into a zero-order subbeam b'(0) and, inter alia, two first-order subbeams b'(+1) and b'(−1), which beams are focussed in points 20, 21 and 22, respectively. If the grating 9 is disposed obliquely in the beam, as is shown in FIG. 3b, the two first-order beams are no longer focussed in one point but each of these subbeams forms two focal lines 15, 16, and 17, 18 respectively. The positions of the focal lines 15 and 18 correspond to the positions of the focal points 21 and 22 in FIG. 1a, whilst the positions of the focal lines 16 and 17 are shifted in opposite directions relative to the positions of the focal points 21 and 22 in FIG. 2a.

As is shown in FIG. 1 the first-order subbeam b(+1) is used for information reading and focus-error detection. The radiation-sensitive detection system 10 is arranged in the path of this subbeam, suitably at a location halfway between the two focal lines 15 and 16 viewed along the chief ray h' of the subbeam. FIG. 2 is a plan view of the detection system 10 taken on the line II—II' in FIG. 1. This system comprises four detectors disposed in four different quadrants of the imaginary X-Y coordinate system. As is described in U.S. Pat. No. 4,358,200 the radiation spot V' formed on the detection system in the case of the correct focussing of the beam b on the information surface 2 is circular and its centre coincides with the centre of the detection system, whilst the spot become elliptical in the case of a focussing error, the direction of the major axis being determined by the sign of the focussing error. If the signals of the detectors are represented by $S_{11}$, $S_{12}$, $S_{13}$ and $S_{14}$, the focus-error signal $S_f$ is:

$$S_f = (S_{11} + S_{13}) - (S_{12} + S_{14})$$

The information signal $S_i$ is given by:

$$S_i = S_{11} + S_{12} + S_{13} + S_{14}$$

In order to preclude the occurrence of crosstalk between a tracking error, i.e. a deviation between the centre of the read spot V and the centre line of a track being read, and the focus-error signal, the detection system 10 is suitably arranged in such a way that one of the bounding lines between the detectors, for example that in the Y-direction extends parallel to the image of the track in the plane of the detection system.

The magnitude of the astigmatism introduced in the subbeam b'(+1) by the grating 9 depends on the obliquity of the grating, i.e. on the angle of incidence of the beam b' on this grating. It has been found that for an adequate slope around the zero point of the focus-error signal the distance between the focal lines 15 and 16 should be of the order of 5 to 15 times the depth of focus of the objective system. The depth of focus is given by $\lambda/NA^2$, where $\lambda$ is the wavelength of the beam b and NA is the numerical aperture of the objective system. In current apparatuses for reading optical record carriers containing an audio program, referred to as Compact Discs or CD, where $\lambda$ is of the order of 800 nm and NA is of the order of 0.45, the desired slope of the focus-error signal is obtained if the angle $\alpha$ is of the order of 10° to 20°.

Also when the read beam b passes the grating for the first time this grating will split the beam into a zero-order subbeam and a plurality of higher-order subbeams. The beam b' shown in FIG. 1 is the zero-order subbeam of the beam b reflected from the information surface. The period of the grating 9 is selected in such a way that the first-order subbeams formed upon the first passage and, consequently, also the higher-order subbeams, are diffracted so far that these subbeams cannot reach the detection system 10 after reflection from the information surface.

An advantage of the scanning device in accordance with the invention is that the detection system and the diode laser are arranged comparatively close to each other and may be accommodated in a common housing.

FIG. 4 shows a scanning device embodying the invention and comprising a reflection grating 9. In this device the read beam is reflected twice by the grating 9, so that the radiation path is "folded" and the overall height of the device can be substantially smaller than that of the device shown in FIG. 1. When a reflection grating in accordance with the invention is utilised in a CD read apparatus the height of the apparatus can be reduced to 20 to 25 mm.

Apart from the fact that the grating is reflecting instead of transmitting, the device shown in FIG. 4 operates in the same way as that in FIG. 1, so that FIG. 4 requires no further explanation.

An advantage of the device shown in FIG. 4 in comparison with that shown in FIG. 1 is the higher stability on account of the two-fold reflection by the same grating mirror.

The invention has been described for an apparatus for reading a record carrier containing prerecorded information, but it may also be utilized in an apparatus for inscribing such record carrier, in which apparatus the focussing is controlled during recording. The device described herein does not utilise any special properties of the information surface 2. It is merely necessary and adequate that this surface is radiation-reflecting. Therefore, the invention may be utilised in various apparatuses in which an accurate focussing is necessary, for example in microscopes.

What is claimed is:

1. A device for scanning a radiation-reflecting information surface with optical radiation, which device comprises a radiation source, an objective system for focussing a radiation beam produced by the radiation source so as to form a radiation spot on the information surface, a diffraction grating arranged between the radiation source and the objective system for separating the radiation beam reflected by the information surface from the beam emitted by the source and for introducing astigmatism in the reflected beam, and a radiation-sensitive detection system comprising a four-quadrant photodiode for supplying a focus-error signal, characterized in that the grating has a substantially constant grating period and in that the chief ray of the reflected beam makes an acute angle with a normal to the grating.

2. A device as claimed in claim 1, characterized in that the distance between the astigmatic focal lines of the beam which is directed towards the detection system by the diffraction grating is of the order of 5 to 10 times the depth of focus of the objective system.

3. A device as claimed in claim 2, characterized in that the angle between the normal to the grating and the chief ray of the reflected beam is within the the range of approximately 10° to approximately 20°.

4. A device as claimed in claim 1, 2 or 3, characterized in that the grating is radiation-reflecting.

* * * * *